United States Patent
Miyazaki et al.

(10) Patent No.: US 9,377,666 B2
(45) Date of Patent: Jun. 28, 2016

(54) LIGHT MODULATOR

(71) Applicant: SUMITOMO OSAKA CEMENT CO., LTD., Chiyoda-Ku, Tokyo (JP)

(72) Inventors: Norikazu Miyazaki, Tokyo (JP); Katsutoshi Kondou, Tokyo (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/424,573

(22) PCT Filed: Aug. 27, 2013

(86) PCT No.: PCT/JP2013/072837
§ 371 (c)(1),
(2) Date: Feb. 27, 2015

(87) PCT Pub. No.: WO2014/034649
PCT Pub. Date: Mar. 6, 2014

(65) Prior Publication Data
US 2015/0261060 A1   Sep. 17, 2015

(30) Foreign Application Priority Data
Aug. 31, 2012  (JP) ................................ 2012-192204

(51) Int. Cl.
*G02F 1/225* (2006.01)
*G02B 6/12* (2006.01)
*G02F 1/21* (2006.01)

(52) U.S. Cl.
CPC ...... *G02F 1/225* (2013.01); *G02B 2006/12159* (2013.01); *G02F 2001/212* (2013.01); *G02F 2201/58* (2013.01)

(58) Field of Classification Search
None
See application file for complete search history.

(56) References Cited

U.S. PATENT DOCUMENTS

| 5,627,929 | A  | * | 5/1997 | Vawter | G02B 6/125 385/131 |
| 5,953,466 | A  | * | 9/1999 | Kubota | G02F 1/0123 385/14 |
| 7,474,812 | B2 | * | 1/2009 | Kawano | G02F 1/0123 385/28 |
| 2006/0110089 | A1 | * | 5/2006 | Ichikawa | G02F 1/0311 385/3 |
| 2008/0025662 | A1 |   | 1/2008 | Kondo et al. | |

(Continued)

FOREIGN PATENT DOCUMENTS

JP        5-53086 A  *  3/1993
JP    WO2006/090863     8/2006

(Continued)

*Primary Examiner* — Mike Stahl
(74) *Attorney, Agent, or Firm* — Taft Stettinius & Hollister LLP

(57) ABSTRACT

An object is to provide a light modulator capable of highly accurate bias control by maintaining main output characteristics and monitor characteristics in an appropriate relationship and matching a bias point determined using monitor output and an optimal bias point of main output. The light modulator includes an optical waveguide formed in a substrate having a thickness of 20 μm or less, in which the optical waveguide includes a Mach-Zehnder waveguide and an output waveguide for guiding signal light from a multiplexing portion of the Mach-Zehnder waveguide and outputting the signal light outside the substrate and monitoring means that monitors signal light or radiated light. Leaked light-removing means for removing some of the radiated light propagating through the output waveguide from the output waveguide and emitting the radiated light outside the substrate is provided in the light modulator.

17 Claims, 5 Drawing Sheets

(56) References Cited

U.S. PATENT DOCUMENTS

2011/0194802 A1* 8/2011 Sugiyama ............ G02F 1/0356
   385/3
2012/0207425 A1   8/2012 Kondou
2013/0306848 A1* 11/2013 Dell'Orto ............ G02F 1/2255
   250/227.11
2014/0023310 A1*  1/2014 Katou ................ G02B 6/29352
   385/3

FOREIGN PATENT DOCUMENTS

| JP | 2006-301612 A | | 11/2006 |
| JP | 2008-180997 A | * | 8/2008 |
| JP | 2011-075906 A | | 4/2011 |
| JP | 2012-173653 A | | 9/2012 |
| WO | WO 2012/115133 A1 | * | 8/2012 |

* cited by examiner

LIGHT MODULATOR

FIELD OF THE INVENTION

The present invention relates to a light modulator, and particularly to a light modulator including monitoring means that monitors radiated light emitted from a multiplexing portion of a Mach-Zehnder waveguide.

DESCRIPTION OF RELATED ART

In technical fields of optical communication and the like, light modulators including a Mach-Zehnder waveguide are used. In recent years, in order to improve the modulation characteristics of light modulators, thin substrate type light modulators in which the thickness of a substrate reaches 20 μm or less have been put into practical use.

In the thin substrate type light modulators in which the thickness of a substrate reaches 20 μm or less as a clad layer of an optical waveguide, a high-order mode is propagated as unnecessary light in the vicinity of the optical waveguide. Therefore, unlike in a structure having a thick substrate, out-phase interfering light (radiated light) emitted from a multiplexing portion of a Mach-Zehnder (MZ) waveguide is not easily separated from a main output waveguide, and is propagated in a manner similar to the high-order mode of the light waveguide.

Therefore, attempts are made to separate the out-phase interfering light (radiated light) from the output waveguide using a method in which a three branch structure having a waveguide for guiding an out-phase interfering light on an output side is used as the structure of the multiplexing portion as described in the following patent literature No. 1, a method in which a guide for out-phase interfering light is used in the vicinity of a branch waveguide as described in the following patent literature No. 2, or the like. In addition, the out-phase interfering light is detected and is used as DC bias monitors of light modulators.

In light modulators for a multilevel modulation format such as a differential quadrature phase shift keying (DQPSK) method, more accurate bias control is required, and thus there is a demand for the relationship between input voltage and output characteristics of the light modulator output and the monitor output to remain unshifted with respect to the bias voltage. Therefore, the following patent literature No. 3 describes a structure in which the qualities of the monitor output are compensated by adding two radiated lights emitted from the multiplexing portion of the MZ waveguide.

Even when the three branch structure or the like is used for the multiplexing portion as described in the following patent literature No. 1, fine out-phase interfering light still remains in the vicinity of the output waveguide as the high-order. When this light is combined with the optical fiber output, the main output from the fiber becomes the multiplex of the output light of in-phase interference and out-phase interfering light.

Particularly, in a case in which in-phase interfering light and out-phase interfering light are incorporated together, light rays having different bias phases are incorporated together, and thus the bias points shift compared with a case in which in-phase interfering light and out-phase interfering light are not incorporated together. Furthermore, the degree of the shift has a relationship with the mixing ratio or light phase of the incorporated light rays, and thus wavelength dependency or temperature dependency due to the deviation of the fiber position or the like caused by a change in the environmental temperature and the like is likely to be generated between main output characteristics and monitor characteristics. In addition, there are problems in that the bias point is controlled on the basis of the monitor output becomes inappropriate with respect to the main output, and the qualities of modulation signals deteriorate. This phenomenon occurs with respect to output light, and thus cannot be solved using the structures of the related art.

The following patent literature No. 4 discloses that, in order to remove radiated light generated at the multiplexing portion of the Mach-Zehnder waveguide, a waveguide for radiated light is provided at the multiplexing portion, and a high-order mode light-absorbing region is formed in the vicinity of a waveguide for output. However, the patent literature No. 4 does not disclose anything about the constitution for maintaining monitor characteristics for which out-phase interfering light (radiated light) is used and main output characteristics in an appropriate relationship. That is, when radiated light is incorporated into main output light, not only on/off characteristics but also phase difference characteristics are affected. Particularly, even the incorporation of a slight amount of radiated light into main output light significantly changes phase difference characteristics. Therefore, it is not possible to ignore the incorporation of fine radiated light with main output light generated by the deviation of the fiber position. For example, when the ratio of power being incorporated is 40 dB, the phase difference changes by as much as approximately 0.6%. Meanwhile, regarding the degree of phase difference required of light modulators, the phase difference needs to be set to 1% or less in a case in which high-quality monitors are required, and thus it is necessary to set the amount of radiated light incorporated into main output light to be extremely small.

PRIOR ART

Patent Literature

Patent literature No. 1: Japanese Laid-open Patent Publication No. 2006-301612
Patent literature No. 2: Pamphlet of International Publication No. W02006-090863
Patent literature No. 3: Japanese Patent Application No. 2011-037718 (filed on Feb. 23, 2011)
Patent literature No. 4: Japanese Laid-open Patent Publication No. 2011-75906

SUMMARY OF THE INVENTION

Technical Problem

An object of the present invention is to provide a light modulator which solves the above-described problems and is capable of highly accurate bias control by maintaining main output characteristics and monitor characteristics in an appropriate relationship and matching a bias point determined by using monitor output and an optimal bias point of main output.

Solution to Problem

In order to solve the above-described problems, a light modulator of the present invention has the following technical features.

(1) A light modulator including an optical waveguide formed in a substrate having a thickness of 20 μm or less in which the optical waveguide includes a Mach-Zehnder waveguide and an output waveguide for guiding signal light from a multiplexing portion of the Mach-Zehnder waveguide and outputting the signal light outside the substrate and monitoring means that monitors signal light or radiated light, in which leaked light-removing means for removing some of the radiated light propagating through the output waveguide from the output waveguide and emitting the radiated light outside the substrate is provided.

(2) The light modulator according to (1), in which signal light emitted from the output waveguide is guided using an optical fiber disposed opposite to an edge face of the substrate.

(3) The light modulator according to (1) or (2), in which the radiated light is radiated light outputted from the multiplexing portion when the signal light is in an off state.

(4) The light modulator according to any one of (1) to (3), in which the leaked light-removing means is a slab waveguide that is disposed in the vicinity of the output waveguide and is continuously formed up to the edge portion of the substrate.

(5) The light modulator according to any one of (1) to (3), in which the leaked light-removing means is a light-absorbing material disposed in the vicinity of the output waveguide.

(6) The light modulator according to any one of (3) to (5), in which the monitoring means includes an optical waveguide for radiated light branched from the multiplexing portion.

(7) The light modulator according to any one of (1) to (6), in which a length of the leaked light-removing means along the output waveguide is 1 mm or less.

Advantageous Effects of Invention

Since the light modulator of the present invention is a light modulator including an optical waveguide formed in a substrate having a thickness of 20 µm or less, in which the optical waveguide includes a Mach-Zehnder waveguide and an output waveguide for guiding signal light from a multiplexing portion of the Mach-Zehnder waveguide and outputting the signal light outside the substrate and monitoring means that monitors radiated light output from the multiplexing portion when the signal light is in an off state, and leaked light-removing means for removing some of the radiated light propagating through the output waveguide from the output waveguide and emitting the radiated light outside the substrate is provided, it becomes possible to match a bias point determined by using monitor output and an optimal bias point of main output, and it becomes possible to provide a light modulator capable of highly accurate bias control.

DETAILED DESCRIPTION OF THE INVENTION

Figure 1:
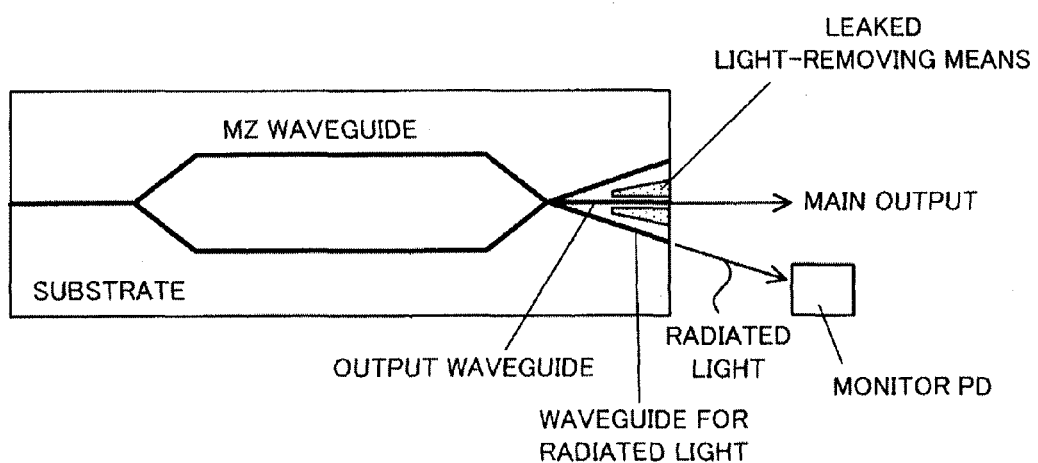
FIG. 1 is a schematic view illustrating an example of a light modulator of the present invention.

Hereinafter, a light modulator of the present invention will be described in detail using preferable examples. As illustrated in FIG. 1, the light modulator of the present invention is a light modulator including an optical waveguide formed in a substrate having a thickness of 20 µm or less, in which the optical waveguide includes a Mach-Zehnder (MZ) waveguide and an output waveguide for guiding signal light from a multiplexing portion of the Mach-Zehnder waveguide and outputting the signal light outside the substrate and monitoring means that monitors signal light or radiated light, and leaked light-removing means for removing some of the radiated light propagating through the output waveguide from the output waveguide and emitting the radiated light outside the substrate is provided.

As the substrate, it is possible to use a substrate having an electro-optic effect such as lithium niobate or lithium tantalate. As a method for forming the light waveguide, for example, a high refractive index substance such as titanium (Ti) is formed on a lithium niobate substrate (LN substrate) through thermal diffusion. In addition, like a ridge-type waveguide, it is also possible to form the optical waveguide by forming protrusions and recesses in the substrate. In the case of the ridge-type optical waveguide, it is possible to form the substrate and the waveguide using a polymer. For example, a high refractive index polymer having protrusion portions is disposed on a core portion, and a low refractive index polymer is disposed as a clad layer above and below the high refractive index polymer so as to sandwich the high refractive index polymer, thereby producing a planar substrate including a light waveguide.

In the light modulator of the present invention, a lithium niobate substrate or the like having a substrate thickness of 20 µm or less is used. For example, an LN wafer having a Ti diffused waveguide formed therein is polished to be 20 µm or less thick, is fixed to a holding substrate through an adhesive, and then is used as the substrate. The thickness of the substrate can be decreased even after the formation of electrodes.

Regarding the formation of electrodes such as an electrode for modulation and an electrode for phase shifting, a seed layer is formed through deposition, sputtering, CVD, or the like to be approximately 100 nm thick, and furthermore, the electrodes can be formed using a semi-additive method of electroplating.

In the light modulator of the present invention, at least one Mach-Zehnder (MZ) waveguide is formed on the thin substrate, and the electrode for modulation, not illustrated, is disposed along the MZ waveguide. In-phase interfering light at the multiplexing portion of the MZ waveguide serves as main output light, and out-phase interfering light (radiated light) serves as monitor output light.

Figure 2:
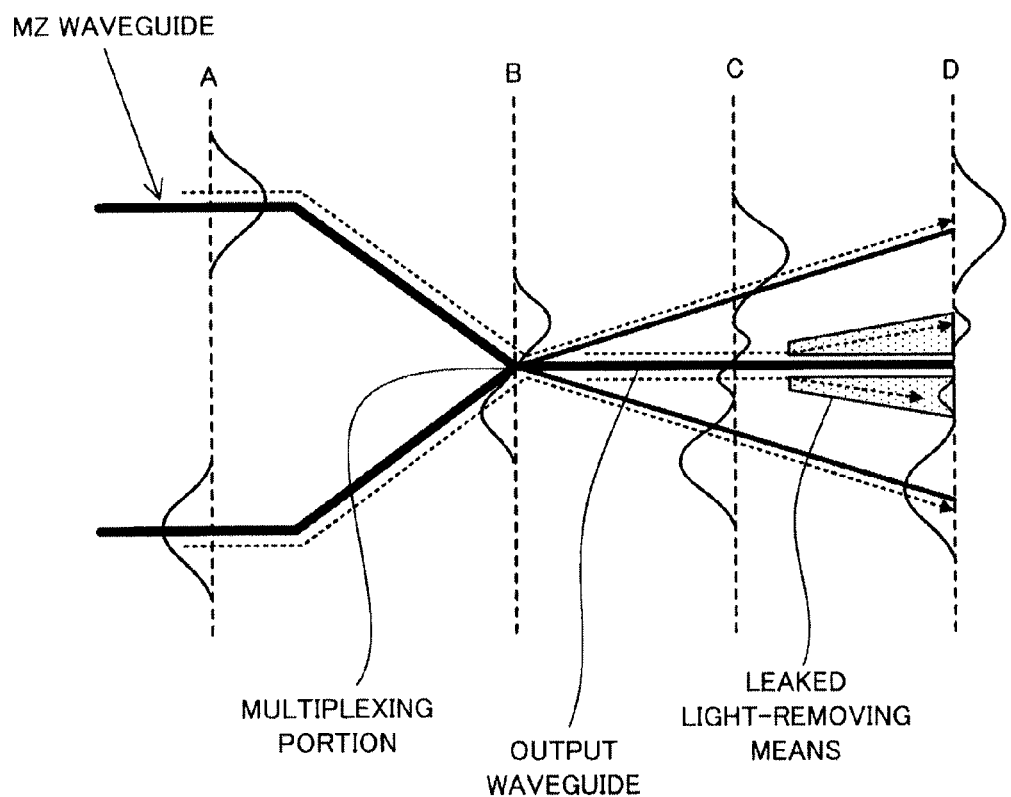
FIG. 2 is a view describing a state of a light wave propagating from a multiplexing portion of a Mach-Zehnder waveguide through leaked light-removing means in the light modulator of FIG. 1.

A feature of the present invention is that, as illustrated in FIG. 2, a high-order mode-removing structure constituted in a waveguide structure is provided in the vicinity of a main output waveguide extending from the multiplexing portion as the leaked light-removing means so as to remove out-phase interfering light remaining in the vicinity of the main output waveguide as the high-order mode of the waveguide. The removing structure is disposed up to the vicinity of the substrate edge to prevent the recombination of removed light with main output and the input of the recombined light into the fiber.

Figure 3:
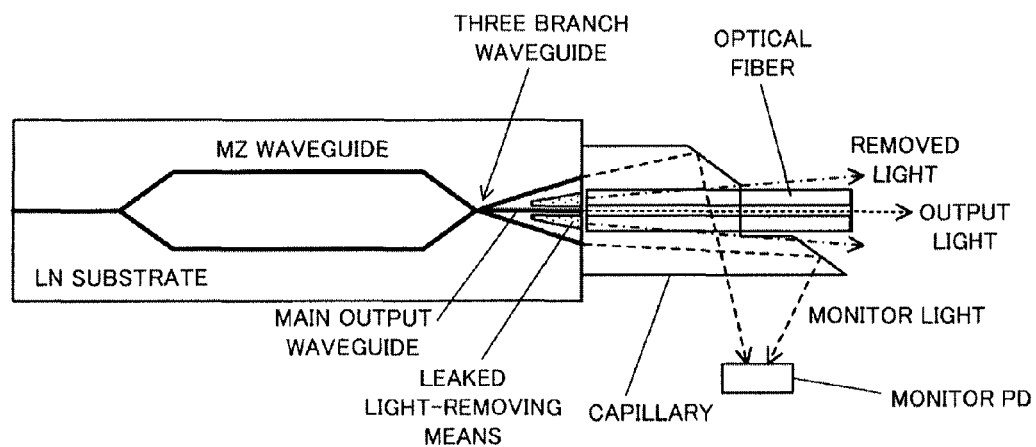
FIG. 3 is a schematic view illustrating an example of the light modulator of the present invention which includes monitor means.

In FIGS. 1 to 3, a three branch structure is used for the multiplexing portion. Light modulated at individual action portions (branch waveguides) of the Mach-Zehnder waveguide is interfered with at the multiplexing portion, and in a case in which the light is interfered with in phase, the light is outputted to the main output waveguide having a wide width in the center of the three branch structure for output. On the other hand, in a case in which the light is interfered with in out-phase, as illustrated in FIG. 2, a majority of optical power is outputted to outside waveguides having a narrow width (waveguides for radiated light) of the three branch structure; however, in the case of a thin substrate structure, some of the power is propagated as the high-order mode of the waveguide (main output waveguide) in the center waveguide. The leaked light-removing means is formed to remove the high-order mode.

The leaked light-removing means can be constituted of a slab waveguide that is disposed in the vicinity of the output waveguide and is continuously formed up to the vicinity of the edge portion of the substrate or a light-absorbing material disposed in the vicinity of the output waveguide. In a case in which the slab waveguide is used, it is possible to simultaneously form the leaked light-removing means in accordance with a process for forming other light waveguides, and in a case in which the light-absorbing material is constituted of the same material as the electrodes, it is possible to form the light-absorbing material in at least a part of the electrode-forming process.

As illustrated in FIG. 3, signal light (output light) emitted from the main output waveguide is guided outside using an optical fiber disposed opposite to the edge face of the LN substrate. The leaked light-removing means functions to prevent leaked light other than main output light (high-order mode light, radiated light, and the like) from being incorporated into the optical fiber.

Figure 4:
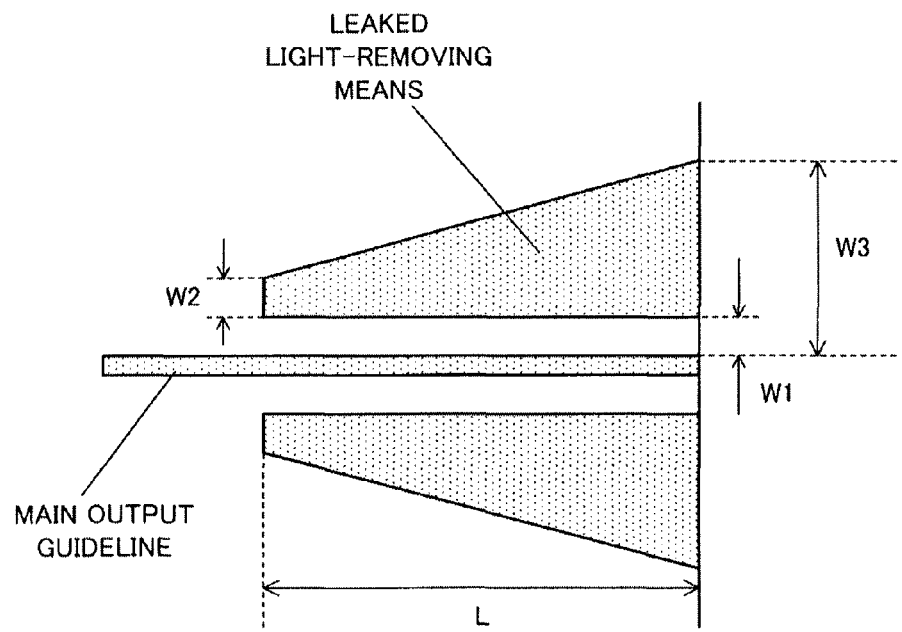
FIG. 4 is a plan view illustrating leaked light-removing means used in the light modulator of the present invention.

FIG. 4 illustrates the appearance of the leaked light-removing means constituted in the slab waveguide. The slab waveguide is disposed close to the main waveguide in order to combine the high-order mode present in the vicinity of the main output waveguide with the removing waveguide (slab waveguide). However, some fundamental mode light, which is signal light, is also combined with the removing waveguide (slab waveguide) together with the high-order mode, and thus output loss is caused as much. Therefore, a gap W1 between the main output waveguide and the removing waveguide is set in a range of approximately once to twice the mode field diameter of the fundamental mode light, and in a case in which an optical waveguide formed by Ti diffusion is used as the LN substrate, the gap is set in a range of 10 μm to 20 μm. In addition, when the length L of the removing waveguide (slab waveguide) along the main output waveguide is set to 1 mm or less, it becomes possible to prevent not only the combination of the fundamental mode light with the slab waveguide but also a disadvantage in which the high-order mode with which the slab waveguide is combined is re-combined with the main output waveguide. As a result, it is possible to suppress the excessive loss at 0.5 dB or less and suppress the shifting of the bias point.

The input side of the removing waveguide (slab waveguide) desirably has a structure capable of suppressing the mode conversion caused by the discontinuous structure resulting from the disposition of the removing waveguide, and in FIG. 4, a width W2 on the input side is set to be small. Ideally, the width is desirably zero; however, in this case, it becomes difficult to form a pattern in a photolithography step. As a result, when W2 is set in a range of approximately 1 μm to 2 μm, it is possible to improve manufacturing reproducibility.

Furthermore, in order to prevent removed light (high-order mode) from, again, being distributed in the vicinity of the main output waveguide, the removing waveguide is disposed through the substrate edge surface or a region in the vicinity of the edge surface. In addition, when a width W3 between the outside boundary line of the removing waveguide and the main waveguide on the edge surface is set to 50 μm or less, it is possible to significantly separate monitor light propagating through the three branch waveguide and the removed light, and to suppress the incorporation of the removed light into the monitor light.

In FIG. 4, the substrate edge is vertical with respect to the waveguide, but the edge surface may be inclined with respect to the waveguide in order to prevent the reflection of guided light. Regarding the monitoring method as well, FIG. 3 illustrates a method in which a capillary that is a fiber holding member is used, but a method in which a fiber is connected to a waveguide for monitoring light (waveguide for radiated light), or a light-receiving element (PD) is disposed on the substrate edge or the waveguide so as to directly extract signals from the waveguide for monitoring light may be used.

Figure 5:
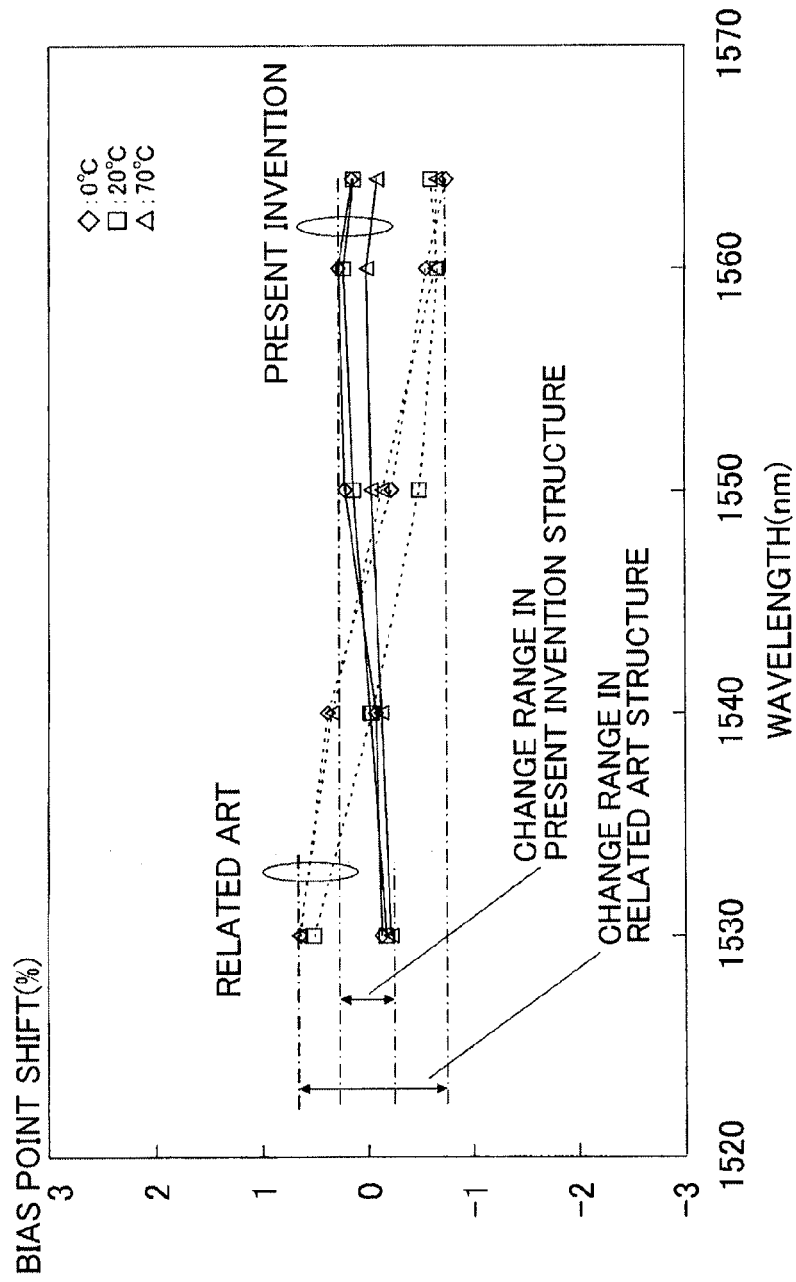
FIG. 5 is a graph illustrating how bias points shift with respect to a change in temperature.

FIG. 5 illustrates an example in which the wavelength dependency and temperature dependency of the shift of the bias points between the fiber output light and the monitor output are measured using the light modulator having a structure of FIGS. 3 and 4. In FIG. 5, the horizontal axis indicates wavelength, and the vertical axis indicates the amount of the shift of the bias points between the output and the monitor standardized by Vπ of the modulator. The solid lines in the drawing indicate a case in which the leaked light-removing means is provided and the broken lines indicate a case in which there is no leaked light-removing means. As illustrated in FIG. 5, when the structure of the present invention is used, it is possible to obtain stable bias point shifting characteristics with respect to temperature or wavelength. As described above, when the structure of the present invention is used, stabilized modulator bias control becomes possible, and it is possible to obtain favorable modulator signal output even in a case in which the wavelength or the environmental temperature is changed.

Figure 6A:
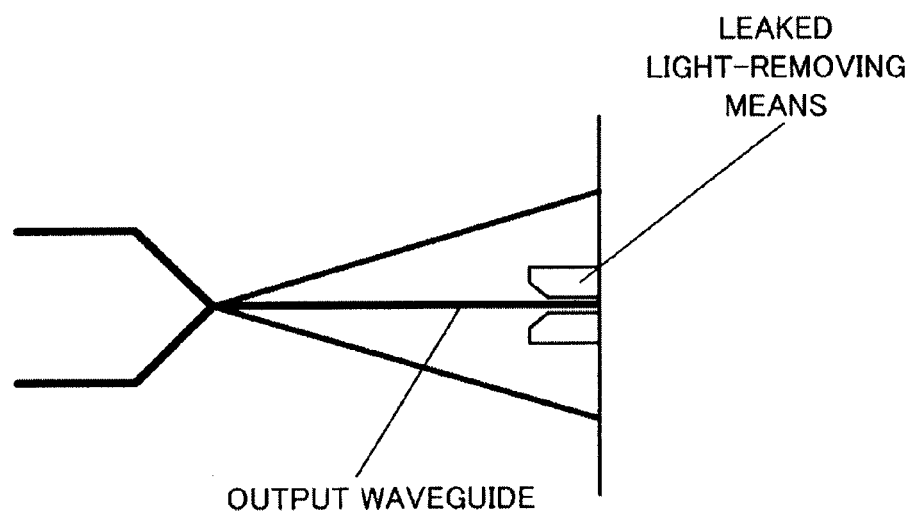
FIG. 6 is a view describing another shape of the leaked light-removing means.
Figure 6B:
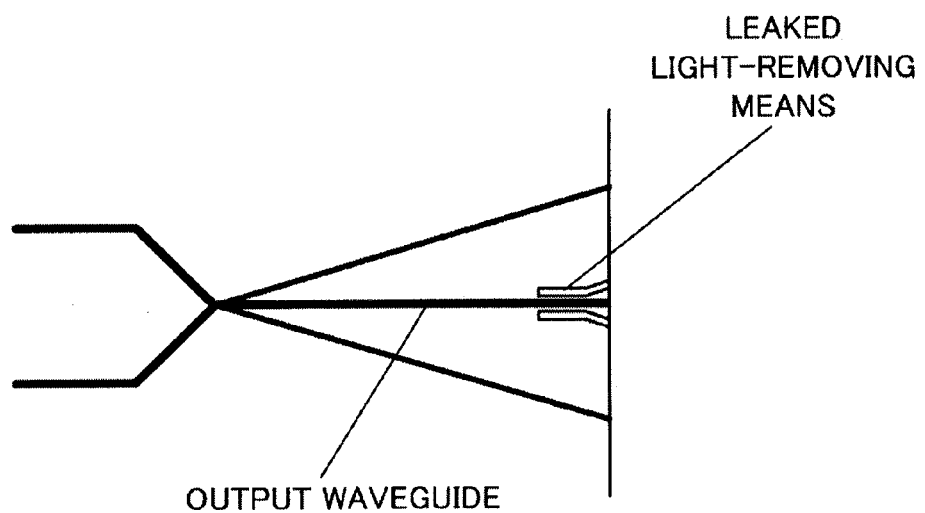

FIG. 6 is a view describing another shape of the slab waveguide used in the leaked light-removing means. As illustrated in FIG. 6A, in order to decrease the discontinuity on the input side, it is possible to employ a structure in which a removing portion gradually approaches the waveguide. In addition, as illustrated in FIG. 6B, regarding the output side as well, in order to suppress the combination with the fiber, it is also possible to employ a structure in which the gap increases as the main output waveguide and the slab waveguide gradually separates from each other.

In a case in which the light-absorbing material is used as the leaked light-removing means, a material imparting optical loss such as Au or Al may be used for an absorbing layer, or the leaked light-removing means may be constituted using a material having a higher refractive index than the substrate that is a clad layer such as a semiconductor material so as to extract light from the waveguide substrate.

INDUSTRIAL APPLICABILITY

As described above, according to the present invention, it becomes possible to provide a light modulator capable of highly accurate bias control by maintaining main output characteristics and monitor characteristics in an appropriate relationship and matching a bias point determined using monitor output and an optimal bias point of main output.

What is claimed is:
1. A light modulator comprising an optical waveguide formed in a substrate having a thickness of 20 μm or less, in which the optical waveguide comprises a Mach-Zehnder waveguide,
an output waveguide for guiding signal light from a multiplexing portion of the Mach-Zehnder waveguide and outputting the signal light outside the substrate and an optical waveguide for radiated light branched from the multiplexing portion, and monitoring means that monitors the radiated light from the optical waveguide for radiated light, further comprising leaked light-removing means for removing some of the radiated light propagating through the output waveguide from the output waveguide and emitting the radiated light outside the substrate and located between the output waveguide and the optical waveguide for radiated light.

2. The light modulator according to claim 1, wherein signal light emitted from the output waveguide is guided using an optical fiber disposed opposite to an edge face of the substrate.

3. The light modulator according to claim 1, wherein the radiated light is radiated light outputted from the multiplexing portion when the signal light is in an off state.

4. The light modulator according to claim 1, wherein the leaked light-removing means is a slab waveguide that is disposed in a vicinity of the output waveguide and is continuously formed up to an edge portion of the substrate.

5. The light modulator according to claim 1, wherein the leaked light-removing means is a light-absorbing material disposed in a vicinity of the output waveguide.

6. The light modulator according to claim 1, wherein a length of the leaked light-removing means along the output waveguide is 1 mm or less.

7. The light modulator according to claim 2, wherein the radiated light is radiated light outputted from the multiplexing portion when the signal light is in an off state.

8. The light modulator according to claim 2, wherein the leaked light-removing means is a slab waveguide that is disposed in a vicinity of the output waveguide and is continuously formed up to an edge portion of the substrate.

9. The light modulator according to claim 3, wherein the leaked light-removing means is a slab waveguide that is disposed in a vicinity of the output waveguide and is continuously formed up to an edge portion of the substrate.

10. The light modulator according to claim 2, wherein the leaked light-removing means is a light-absorbing material disposed in a vicinity of the output waveguide.

11. The light modulator according to claim 3, wherein the leaked light-removing means is a light-absorbing material disposed in a vicinity of the output waveguide.

12. The light modulator according to claim 4, wherein the leaked light-removing means is a light-absorbing material disposed in a vicinity of the output waveguide.

13. The light modulator according to claim 7, wherein the leaked light-removing means is a light-absorbing material disposed in a vicinity of the output waveguide.

14. The light modulator according to claim 8, wherein the leaked light-removing means is a light-absorbing material disposed in a vicinity of the output waveguide.

15. The light modulator according to claim 9, wherein the leaked light-removing means is a light-absorbing material disposed in a vicinity of the output waveguide.

16. The light modulator according to claim 2, wherein a length of the leaked light-removing means along the output waveguide is 1 mm or less.

17. The light modulator according to claim 3, wherein a length of the leaked light-removing means along the output waveguide is 1 mm or less.

* * * * *